United States Patent [19]

Birsching

[11] Patent Number: 4,836,566
[45] Date of Patent: Jun. 6, 1989

[54] FOUR-WHEEL STEERING SYSTEM
[75] Inventor: Joel E. Birsching, Sebewaing, Mich.
[73] Assignee: General Motors Corporation, Detroit, Mich.
[21] Appl. No.: 203,849
[22] Filed: Jun. 8, 1988
[51] Int. Cl.$^4$ .............................................. B62D 5/06
[52] U.S. Cl. ...................................................... 280/91
[58] Field of Search .................. 280/91, 98, 100, 101, 280/102

[56] References Cited

U.S. PATENT DOCUMENTS

| | | | |
|---|---|---|---|
| 4,557,493 | 12/1985 | Sano et al. | 280/91 |
| 4,648,614 | 3/1987 | Hyodo | 280/91 |
| 4,703,822 | 11/1987 | Kawamoto et al. | 280/91 |
| 4,709,936 | 12/1987 | Tashiro et al. | 280/91 |
| 4,719,981 | 1/1988 | Miyoshi | 280/91 |

*Primary Examiner*—Richard A. Bertsch
*Attorney, Agent, or Firm*—Saul Schwartz

[57] ABSTRACT

In a four-wheel steering system for automotive vehicles of the type having a front rack and pinion steering gear of the front wheels and a rear rack and pinion steering gear for the rear wheels, a gear box is disposed between the control shaft from the front steering gear and the pinion shaft of the rear steering gear. A crank assembly having a variable eccentricity wrist pin is disposed on the end of the control shaft within the gear box. The wrist pin is slidably received in a track on a gear sector in the gear box. The gear sector meshes with a spur gear on the end of the rear pinion shaft within the gear box. In a null position of the wrist pin, the latter is on the axis of rotation of the control shaft so that no rear steering occurs. When the wrist pin is moved from the null position and the control shaft rotated, the gear sector is pivoted in a direction corresponding to the direction of displacement of the wrist pin thereby to rotate the spur gear and steer the rear wheels.

6 Claims, 2 Drawing Sheets

FOUR-WHEEL STEERING SYSTEM

FIELD OF THE INVENTION

This invention relates to four-wheel steering systems for automotive vehicles.

BACKGROUND OF THE INVENTION

In automotive four-wheel steering systems, the steering direction or phase of the rear wheels relative to the front wheels is customarily the same (positive) at vehicle speeds above a relatively low transition speed and opposite (negative) at vehicle speeds below the transition speed. Some proposed systems achieve this relationship through simple crank mechanisms where a wrist pin of a crank on the end of a longitudinal control shaft is received in a slotted yoke attached to a laterally extending rear steer control element. The control shaft is rotated by the front steering gear at a preselected ratio relative to the steering wheel of the vehicle in a direction corresponding to the direction of steering wheel rotation. The wrist pin driven by the control shaft moves the yoke and lateral control element through excursions proportional to the sine of the angular displacement of the crank from a position corresponding to straight ahead driving. In a more complex realization of the crank and slotted yoke concept, the slotted yoke is defined on a member rotatable by the control shaft and the crank is defined on the lateral rear steer control element. The rear steer control element is rotatable about its longitudinal axis whereby the phase of rear wheel steer relative to front wheel steer is established and whereby the ratio rear wheel steering movement to front wheel steering movement is varied. A four-wheel steering system according to this invention embodies a novel, more simple realization of the crank and slotted yoke concept.

BRIEF SUMMARY OF THE INVENTION

This invention is a new and improved four-wheel steering system for automotive vehicles. In the steering system according to this invention, the front steering gear drives a longitudinal rear steer input shaft having a crank at its aft end carrying a wrist pin which is radially shiftable on the crank in opposite directions from a null position aligned on the axis of rotation of the crank. The crank and wrist pin are disposed in a housing on the vehicle on which a gear sector is supported for rotation about an axis parallel to the axis of rotation of the rear steer input shaft. The gear sector has a radially extending track which slidably receives the wrist pin. With the wrist pin in the null position, the sector remains stationary when the rear steer input shaft rotates. When the wrist pin is displaced from the null position, the sector gear rotates in a direction determined by the direction of displacement of the wrist pin from the null position and through an included angle which depends upon the magnitude of the excursion of the wrist pin from the null position. The sector gear meshes with a pinion which, in turn, drives a rack and pinion steering gear for the rear wheels. A hydraulic control system locates the wrist pin on the crank as a function of vehicle speed and springs mechanically bias the wrist pin to the null position for returning the rear wheels to straight ahead positions in the absence of hydraulic control pressure.

DESCRIPTION OF THE PREFERRED EMBODIMENTS

Figure 1:
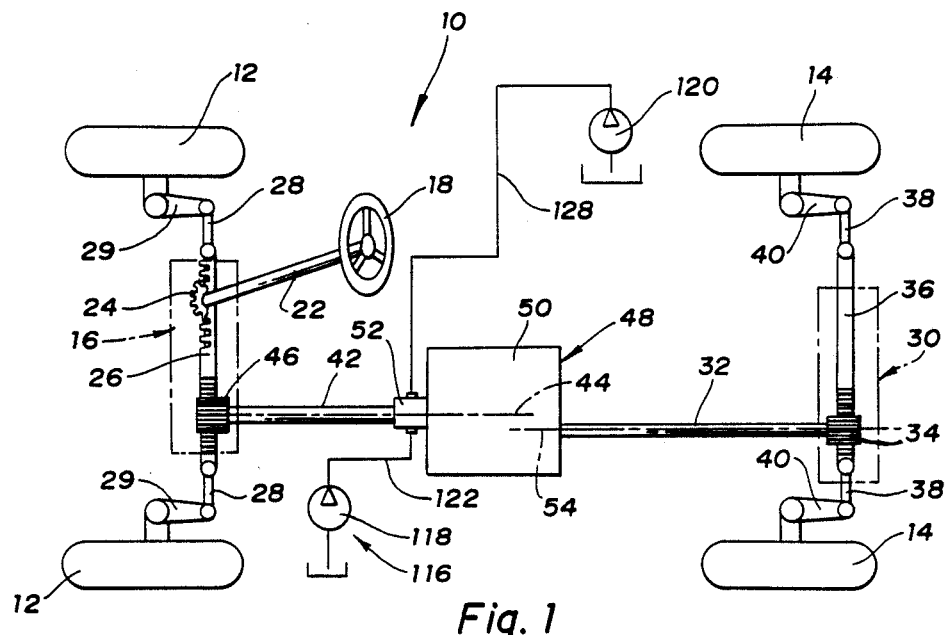
FIG. 1 is a schematic view of an automotive vehicle having a four-wheel steering system according to this invention.

Referring to FIG. 1 of the drawings, a fragmentarily and schematically illustrated automotive vehicle 10 has a pair of front wheels 12 and a pair of rear wheels 14. The front wheels are steerable in unison about generally vertical front steering axes of the vehicle by a representative rack and pinion front steering gear 16 under the control of a driver operated steering wheel 18. The front steering gear includes a pinion shaft 22 rotatable with the steering wheel, a pinion 24 on the pinion shaft, and a transverse steering rack 26 having teeth meshing with the pinion 24 and shiftable laterally in response to rotation of the pinion shaft. The steering rack 26 is connected at opposite ends to respective ones of the steering knuckles 20 through corresponding ones of a pair of rod ends 28 and a pair of steering knuckles 29.

The rear wheels 14 are steerable in unison about generally vertical rear steering axes of the vehicle by a representative rack and pinion rear steering gear 30 under the control of a rear pinion shaft 32. The rear steering gear 30 includes, in addition to the rear pinion shaft 32, a pinion 34 on the rear pinion shaft, and a transverse steering rack 36 having teeth meshing with the pinion 34 and shiftable laterally in response to rotation of the rear pinion shaft. The steering rack 36 is connected at opposite ends to the rear wheels 14 through corresponding ones of a pair of rod ends 38 and a pair of steering knuckles 40.

Figure 2:
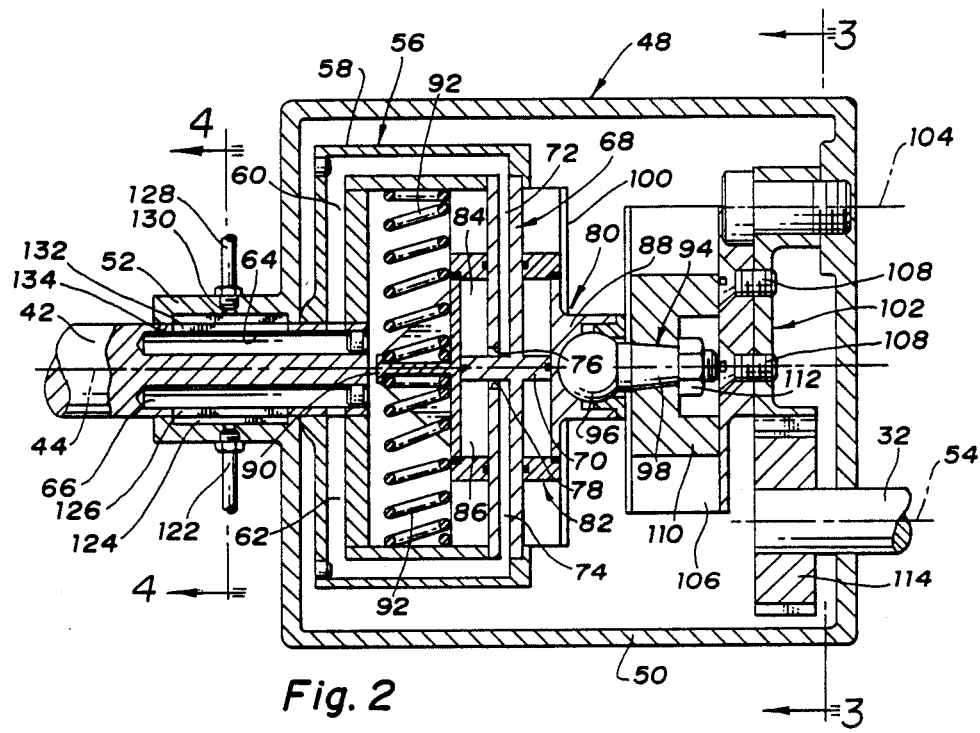
FIG. 2 is an enlarged sectional view of a portion of FIG. 1.

As seen best in FIGS. 1 and 2, the front steering gear 16 further includes a rear steer control shaft 42 supported on the steering gear and the vehicle for rotation about a first longitudinal axis 44 of the vehicle. The shaft 42 has a pinion 46 meshing with rack teeth on the steering rack 26 so that rotation of the steering wheel 18 effects concurrent rotation of the shaft 42 in a direction corresponding to the direction of rotation of the steering wheel and at a ratio determined by the relative sizes of the pinions 24 and 46.

A housing 48 is disposed on the vehicle between the front and rear wheels. The housing 48 has main enclosure portion 50 and an annular neck 52 aligned on the axis 44. The aft end of the rear steer control shaft 42 projects into the enclosure portion 50 and is closely journaled in the annular neck 52. The forward end of the rear pinion shaft 32 projects into the enclosure portion 50 and is rotatably supported on the corresponding wall of the housing for rotation about a second longitudinal axis 54 of the vehicle parallel to and spaced from the first axis 44.

A crank assembly 56 is attached to the aft end of the rear steer control shaft 42 within the enclosure portion 50 of the housing 48. The crank assembly includes a drum 58 rigidly affixed to the aft end of the shaft 42. The drum 58 has a first internal passage 60 and a second internal passage 62 therein which communicate, respectively, with a first passage 64 and a second passage 66 in the rear steer control shaft 42. A guide 68 disposed diametrically across the drum and perpendicular to the axis 44 is rigidly affixed at opposite ends to the drum. The guide 68 has a rigid piston 70 mid-way between its ends and a pair of internal passages 72 and 74 on opposite sides of the piston which communicate, respectively, with the passages 60 and 62 in the drum 58. A port 76 opens through the guide 68 to the passage 72 and another port 78 opens through the guide 68 to the passage 74.

The crank assembly 56 has a wrist pin assembly 80 thereon including a cylinder 82 slidably disposed on the guide 68. The piston 70 divides the cylinder 82 into a first working chamber 84 and a second working chamber 86 which communicate, respectively, with the passages 72 and 74 through the ports 76 and 78. The cylinder 82 has an integral socket 88 on an outside wall thereof and an integral abutment 90 on the outside wall diametrically opposite the socket. A pair of springs 92 seat on opposite sides of the abutment 90 and against the inside of the drum 58. The springs 92 center the cylinder 82 on the first axis 44. A ball stud 94 of the wrist pin assembly has a spherical head 96 in the socket 88 and a threaded shank 98. The shank 98 projects through a slot in a trough-like guide 100 on the drum 58 which guide envelops the cylinder 82 and prevents rotation of the cylinder about the guide 68.

Figure 3:
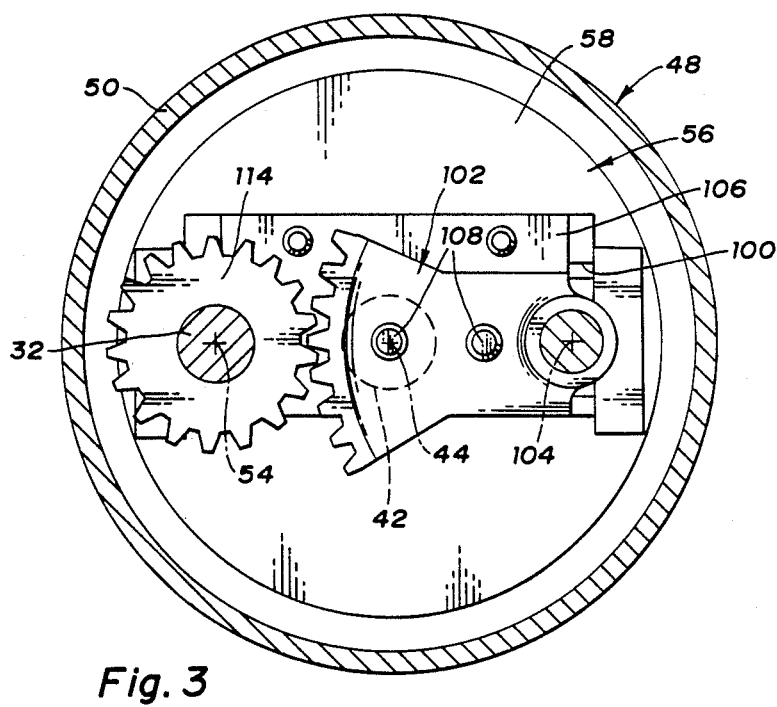
FIG. 3 is a sectional view taken generally along the plane indicated by lines 3—3 in FIG. 2.

As seen best in FIGS. 2 and 3, a gear sector 102 in the enclosure portion 50 of the housing 48 supported on the housing for rotation about a third axis 104 of the vehicle parallel to the axes 44 and 54. Axes 104 and 54 are on opposite sides of first axis 44. A trough-like track 106 is rigidly attached to the gear sector 102 by a pair of screws 108 and opens toward the crank assembly 56. The track 106 extends radially relative to the third axis 104 in a plane perpendicular to the axis. A slide block 110 is disposed in the track 106 for bodily movement along the length thereof. The shank 98 of the ball stud 94 projects through an opening in the slide block and a nut 112 on the shank rigidly unites the ball stud and the slide block.

A spur gear 114 is attached to the forward end of the rear pinion shaft 32 within the enclosure portion 50 of the housing. The spur gear 114 rotates as a unit with rear pinion shaft and meshes with gear teeth on the gear sector 102. The rear pinion shaft 32 thus rotates opposite the gear sector 102 through an included angle dependent upon the included angle of rotation of the gear sector and gear ratio between the gear sector and the spur gear 114.

Referring to FIGS. 1-3, the four-wheel steering system according to this invention operates as follows. The springs 92 bias the wrist pin assembly 80 to a null position characterized by alignment of the socket 88 and the ball stud 94 on the first axis 44. The ball stud locates the slide block 110 generally mid-way between the ends of the track 106 and in a common plane containing the three axes 44, 54 and 104. The sector gear 102, through the spur gear 114 and rear pinion shaft 32, locates the rear wheels 14 in straight ahead positions. With the wrist pin assembly in the null position, the ball stud 94 remains stationary as the control shaft 42, the drum 58, the guide 68 and the cylinder 82 all rotate about the first axis 42. Accordingly, rotation of the control shaft 42 is not transferred to the rear pinion shaft 32 and the rear wheels remain in straight ahead positions as the front wheels are steered in either direction by the steering wheel 18.

To effect negative (opposite) phase steering of the rear wheels for right turn steering of the front wheels, the working chamber 86 is pressurized relative to the working chamber 84 sufficiently to overcome the lower spring 92 and displace the cylinder 82 downward, FIG. 2. The ball stud 94 moves with the cylinder and progressively increases the eccentricity of the wrist pin assembly 80 relative to the axis 44. The slide block 110 moves further away from the third axis 104. When, the steering wheel 18 is turned to steer the front wheels 12 for a right turn, the control shaft 42 and the gear sector both rotate clockwise, FIG. 3, while the spur gear 114 and rear pinion shaft 32 rotate counterclockwise. The steering rack 36 is shifted upward, FIG. 1, and the rear wheels 14 are steered to the left or opposite the front wheels 12. If the steering wheel is turned to steer the front wheels for a left turn, the interactions between the crank assembly, the gear sector and the spur gear are the same but opposite the interactions for a right turn.

To effect positive (same) phase steering of the rear wheels for right turn steering of the front wheels, the working chamber 84 is pressurized relative to the working chamber 86 sufficiently to overcome the upper spring 92 and displace the cylinder 82 upward, FIG. 2. The ball stud 94 moves with the cylinder and progressively increases the eccentricity of the wrist pin assembly 80 relative to the axis 44. The slide block 110 moves closer to the third axis 104. When the steering wheel 18 is turned to steer the front wheels 12 for a right turn, the control shaft 42 rotates in the same direction as the preceding negative phase example but the wrist pin assembly 80 rotates the gear sector 102 counterclockwise, FIG. 3. The gear sector 102, in turn, rotates the spur gear 114 and the rear pinion shaft 32 clockwise, FIG. 3. The steering rack 36 is shifted downward, FIG. 1, and the rear wheels 14 are turned to the right like the front wheels. If the steering wheel is turned to steer the front wheels for a left turn, the interactions between the crank assembly, the gear sector, and the spur gear are the same but opposite the interactions for a right turn.

While the steering phase of the rear wheels depends only on the direction of the excursion of the wrist pin assembly 80 from the null position, the ratio of the steering angle of the front wheels to the steering angle of the rear wheels (referred to below as the steering angle ratio) depends upon both the direction and the magnitude of the excursion. If, for example, equal and opposite excursions of the wrist pin assembly are assumed, the included angle of rotation of the sector gear 102, and hence the amount of rear steer, for a given included angle of rotation of the control shaft 42 is greater in positive phase rear steer than in negative phase rear steer and the difference increases as the eccentricity of the wrist pin assembly increases relative to the axis 44.

Figure 4:
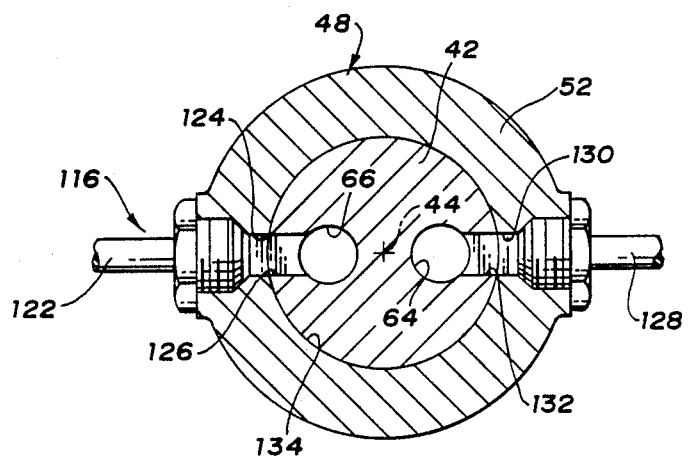
FIG. 4 is a sectional view taken generally along the plane indicated by lines 4—4 in FIG. 2.

The direction, magnitude and timing of the excursions of the wrist pin assembly 80 are established by a representative hydraulic control system 116, FIGS. 1 and 4. The control system includes an engine driven hydraulic pump 118 providing fluid at a generally constant pressure and an output driven hydraulic pump 120 providing fluid at a pressure proportional to vehicle speed. The pump 118 is connected by a pipe 122 to a housing port 124 on the neck 52 of housing 48, FIG. 4. The housing port 124 is aligned with a shaft port 126 on the control shaft 42 only when the control shaft is in a position corresponding to the front wheels being straight ahead. The shaft port 126 communicates with the second passage 66. Similarly, the pump 120 is connected by a pipe 128 to a housing port 130 on the neck 52 of the housing 48, FIG. 4. The housing port 130 is aligned with a shaft port 132 on the control shaft 42 only when the control shaft is in the aforesaid position corresponding to the front wheels being straight ahead. The shaft port 132 communicates with the first passage 64.

When the vehicle is stationary or moving below a low transition speed and the front wheels are straight ahead, the pressure in working chamber 86 in communication with the engine pump 118 substantially exceeds the pressure in working chamber 84 in communication with output pump 120. Lower spring 92 is overcome and cylinder 82 moves downward, FIG. 2, to a limit position or a lesser intermediate position determined by the pressure ratio between the working chambers. When the steering wheel 18 is turned in either direction, the shaft ports 126 and 132 seal against an inside wall 134, FIG. 4, of the neck portion of the housing thereby effectively hydraulically locking the negative steer phase excursion of wrist pin assembly 80 and assuring negative phase rear steer below the transition speed.

At vehicle speeds above the transition speed, the pressure in working chamber 84 in communication with the output pump 120 exceeds the pressure in working chamber 86 in communication with engine pump 118 by an amount sufficient to overcome upper spring 92, FIG. 2. Cylinder 82 moves upward, FIG. 2, to a limit position or a lesser intermediate position determined by the pressure ratio between the working chambers. When the steering wheel 18 is turned in either direction, the shaft ports 126 and 132 seal against the inside wall 134, FIG. 4, of the neck portion of the housing thereby effectively hydraulically locking the positive steer phase excursion of wrist pin assembly 80 and assuring positive phase rear steer above the transition speed. At the transition speed of the vehicle, the pressures in the working chambers 84 and 86 are substantially the same and the springs 92 maintain the wrist pin assembly in the null position. Because the housing ports 124 and 130 register, respectively, with the shaft ports 126 and 132 only in the straight ahead position of the front wheels, steer phase and steering angle ratio change only when the front wheels are straight ahead.

The embodiments of the invention in which an exclusive property or privilege is claimed are defined as follows:

1. In an automotive vehicle, a four-wheel steering system comprising:
   a front steering gear for steering a pair of front wheels of said vehicle in response to rotation of a steering wheel of said vehicle and including a rear steer control shaft rotatable about a first axis of said vehicle in a direction corresponding to the direction of rotation of said steering wheel and at a predetermined ratio relative to said steering wheel rotation,
   a rear steering gear for steering a pair of rear wheels of said vehicle in response to rotation of a rear pinion shaft of said rear steering gear about a second axis of said vehicle parallel to and spaced from said first axis,
   means defining a housing on said vehicle into which each of said control shaft and said rear pinion shaft extends,
   a gear on said rear pinion shaft within said housing rotatable as unit with said rear pinion shaft,
   a gear sector meshing with said gear on said rear pinion shaft and supported on said housing for rotation about a third axis parallel to each of said first and said second axes,
   said second and said third axes being disposed in a common plane containing said first axis and on opposite sides of said first axis,
   means on said gear sector defining a track extending radially relative to said third axis,
   a crank assembly on said control shaft within said housing rotatable as a unit therewith about said first axis having a wrist pin assembly thereon movable radially relative to said first axis through a plurality of eccentric positions relative to said first axis from a null position on said first axis,
   a connecting means on said wrist pin assembly received in said track on said gear sector and slidable therealong so that said gear sector rotates in a negative steer phase direction when said wrist pin assembly is displaced in a negative phase direction relative to said first axis from said null position and rotates in a positive steer phase direction when said wrist pin assembly is displaced in a positive phase direction relative to said first axis from said null position, and
   control means operative to selectively locate said wrist pin assembly in one of said null position and said plurality of eccentric positions displaced from said null position.

2. The four-wheel steering system recited in claim 1 wherein said wrist pin assembly includes
   means on said control shaft defining a guide extending perpendicular to and intersecting said first axis, and
   a cylinder slidably disposed on said guide for bodily shiftable movement in said opposite positive and negative steer phase directions from said null position wherein said cylinder is centered on said first axis,
   said connecting means being attached to said cylinder for bodily shiftable movement therewith.

3. The four-wheel steering system recited in claim 2 and further including
   a pair of springs disposed between said cylinder and said crank assembly operative to bias said wrist pin assembly toward said null position.

4. The four-wheel steering system recited in claim 2 wherein said connecting means includes
   a socket on said cylinder located on said first axis in said null position of said wrist pin assembly,
   a ball stud having a spherical head rotatably disposed in said socket and a shank portion projecting into said track on said gear sector, and
   a block slidably disposed in said track on said gear sector and rigidly attached to said ball stud shank.

5. The four-wheel steering system recited in claim 1 wherein said control means includes
   fluid motor means on said crank means rotatable as a unit with said control shaft and including a cylinder and a piston in said cylinder dividing the interior of said cylinder into a pair of variable volume working chambers on opposite sides of said piston, one of said piston and said cylinder being rigidly connected to said crank means and the other of said piston said cylinder being rigidly connected to said connecting means so that a pressure difference across said piston moves said connecting means relative to said crank means through said plurality of eccentric positions, a first pump on said vehicle providing first fluid pressure at substantially constant magnitude independent of vehicle speed in one of said pair of fluid motor working chambers, and a second pump on said vehicle providing second fluid pressure in the other of said fluid motor working chambers at magnitudes proportional to vehicle speed and in a range of from below said first fluid pressure at speeds below a transition speed to above said first fluid pressure at speeds above said transition speed.

6. The four-wheel steering system recited in claim 5 and further including first valve means disposed between said first pump and said one of said pair of fluid motor working chambers operative to fluid seal said one working chamber when said control shaft is rotated from a position thereof corresponding to a straight ahead steering condition of said front steering gear, and second valve means disposed between said second pump and said other of said pair of fluid motor working chambers operative to fluid seal said other working chamber when said control shaft is rotated from said position thereof corresponding to a straight ahead steering condition of said front steering gear.

* * * * *